United States Patent
Lampe

(10) Patent No.: US 11,408,463 B2
(45) Date of Patent: Aug. 9, 2022

(54) TENSION CABLE CONTROL DUPLEXER

(71) Applicant: James Tanner Lampe, Rochester Hills, MI (US)

(72) Inventor: James Tanner Lampe, Rochester Hills, MI (US)

(73) Assignee: FCA US LLC

( * ) Notice: Subject to any disclaimer, the term of this patent is extended or adjusted under 35 U.S.C. 154(b) by 903 days.

(21) Appl. No.: 16/225,758

(22) Filed: Dec. 19, 2018

(65) Prior Publication Data

US 2020/0200210 A1 Jun. 25, 2020

(51) Int. Cl.
*F16C 1/10* (2006.01)
*F16C 1/14* (2006.01)
*B60K 15/05* (2006.01)
*E05B 83/28* (2014.01)
*B60L 53/16* (2019.01)

(52) U.S. Cl.
CPC .............. *F16C 1/101* (2013.01); *F16C 1/105* (2013.01); *F16C 1/106* (2013.01); *F16C 1/14* (2013.01); *B60K 2015/0561* (2013.01); *B60L 53/16* (2019.02); *E05B 83/28* (2013.01); *F16C 2326/20* (2013.01); *F16C 2350/52* (2013.01)

(58) Field of Classification Search
CPC .......... F16C 1/101; F16C 1/103; F16C 1/105; F16C 1/106; F16C 1/14; F16C 2326/20; F16C 2350/52; B60L 53/16; B60K 2015/0561; E05B 79/20; E05B 83/28
See application file for complete search history.

(56) References Cited

U.S. PATENT DOCUMENTS

| | | | |
|---|---|---|---|
| 2,480,083 A | 8/1949 | Mcmillan | |
| 3,472,096 A | 10/1969 | Krause | |
| 4,331,353 A | 5/1982 | Yazawa et al. | |
| 4,526,057 A | 7/1985 | Mochida et al. | |
| 5,660,081 A | 8/1997 | Sato | |
| 6,199,445 B1 | 3/2001 | Valdez | |
| 9,533,586 B2 * | 1/2017 | Kahara | B60L 53/16 |
| 9,595,790 B1 * | 3/2017 | Cao | H01R 13/62911 |
| 2013/0221159 A1 | 8/2013 | Giannakopoulos | |

FOREIGN PATENT DOCUMENTS

| | | | | |
|---|---|---|---|---|
| DE | 202010012379 U1 * | 2/2012 | | B60K 15/05 |
| GB | 2061443 A * | 5/1981 | | F16C 1/101 |
| GB | 2451838 A * | 2/2009 | | F16C 1/101 |
| KR | 20080055435 A * | 6/2008 | | |

* cited by examiner

*Primary Examiner* — Adam D Rogers
(74) *Attorney, Agent, or Firm* — Ralph E. Smith

(57) ABSTRACT

An electric vehicle includes a charge port configured to selectively lock a charge plug to the charge port, a charge port door configured to provide access to the charge port, a charge port door lock configured to selectively lock the charge port door in a closed position, a primary manual release cable operably coupled to the charge port to manually unlock the charge plug from the charge port, and a secondary tension cable system coupled between the primary manual release cable and the charge port door lock. Actuation of the primary manual release cable simultaneously unlocks the charge plug from the charge port and actuates the secondary tension cable system to unlock the charge port door lock.

18 Claims, 4 Drawing Sheets

TENSION CABLE CONTROL DUPLEXER

FIELD

The present application relates generally to manual release cables for vehicle charge port locks and, more particularly, to a secondary tension system for charge port lock manual release cables.

BACKGROUND

Many electric vehicles include batteries that must be periodically charged. Such vehicles typically include a charge port configured to receive a plug that is electrically coupled to a power source. Many charge ports include a port lock configured to lock the plug in the charge port to prevent unintended removal of the plug from the charge port while the vehicle is charging. In addition, access to the charge port may be restricted by a lockable charge port door, similar to a fuel door for a filler port on a gasoline powered vehicle. In the event of vehicle power loss, the charge port lock and the port door lock must be individually, manually released to separately unlock the port and the door. While current manual release systems do work well for their intended purpose, there remains a need for improvement in the relevant art.

SUMMARY

In one example aspect of the invention, an electric vehicle is provided. In one example implementation, the electric vehicle includes a charge port configured to selectively lock a charge plug to the charge port, a charge port door configured to provide access to the charge port, a charge port door lock configured to selectively lock the charge port door in a closed position, a primary manual release cable operably coupled to the charge port to manually unlock the charge plug from the charge port, and a secondary tension cable system coupled between the primary manual release cable and the charge port door lock. Actuation of the primary manual release cable simultaneously unlocks the charge plug from the charge port and actuates the secondary tension cable system to unlock the charge port door lock.

In addition to the foregoing, the described vehicle may include one or more of the following: wherein the secondary tension cable system comprises a secondary tension coupling device and a secondary cable operably coupled to the charge port door lock for manually unlocking the charge port door lock; and wherein the secondary tension coupling device comprises a primary cable interface portion for coupling to the primary manual release cable, a secondary cable interface portion configured to couple to the secondary cable, and an intermediate portion disposed between the primary cable interface portion and the secondary cable interface portion, wherein actuation of the primary manual release cable causes actuation of the secondary cable via the secondary tension coupling device.

In addition to the foregoing, the described vehicle may include one or more of the following: wherein the primary cable interface portion includes a retention clip extending from a main body portion; wherein the retention clip and the main body portion define a receiving slot therebetween configured to receive the primary manual release cable; and wherein the primary cable interface portion further includes a retention feature extending outwardly from the main body portion toward the retention clip, the retention feature configured to retain the primary manual release cable within the receiving slot.

In addition to the foregoing, the described vehicle may include one or more of the following: wherein the retention feature includes a ramped surface and a stop surface; wherein the retention clip includes an aperture configured to receive at least a portion of the retention feature therein; wherein the secondary cable interface portion includes a hollow shell configured to receive one end of the secondary cable; wherein the hollow shell includes a cable receiving portion and a cable retention portion; and wherein the cable receiving portion defines a cable slot configured to receive the secondary cable therethrough, and a retainer slot configured to receive a retainer coupled to the secondary cable.

In addition to the foregoing, the described vehicle may include one or more of the following: wherein a width of the retainer slot is larger than a width of the retainer, and a width of the cable retention portion is smaller than the width of the retainer slot so as to facilitate securing the retainer to the cable retention portion; wherein the cable retention portion includes a retaining tab to facilitate securing and retaining the retainer within the cable retention portion; and a mounting clip coupled to and extending from the secondary cable interface portion, the mounting clip configured to temporarily secure the secondary tension coupling device to a portion of the vehicle.

In addition to the foregoing, the described vehicle may include one or more of the following: a plurality of spool pegs extending from the secondary cable interface portion, the plurality of spool pegs configured to take up excess length of the secondary cable; wherein the plurality of spool pegs includes first, second, and third spool pegs; and wherein the secondary cable is selectively wound around the secondary cable interface portion and secured between the first and second spool pegs, and between the third spool peg and the intermediate portion.

In addition to the foregoing, the described vehicle may include one or more of the following: wherein the primary cable interface portion includes a retention clip extending from a main body portion, wherein the retention clip and the main body portion define a receiving slot therebetween configured to receive the primary manual release cable, wherein the primary cable interface portion further includes a retention feature extending outwardly from the main body portion toward the retention clip, the retention feature configured to retain the primary manual release cable within the receiving slot, wherein the retention feature includes a ramped surface and a stop surface, and wherein the retention clip includes an aperture configured to receive at least a portion of the retention feature therein, wherein the secondary cable interface portion includes a hollow shell configured to receive one end of the secondary cable, wherein the hollow shell includes a cable receiving portion and a cable retention portion, wherein the cable receiving portion defines a cable slot configured to receive the secondary cable therethrough, and a retainer slot configured to receive a retainer coupled to the secondary cable, wherein a width of the retainer slot is larger than a width of the retainer, and a width of the cable retention portion is smaller than the width of the retainer slot so as to facilitate securing the retainer to the cable retention portion, and wherein the cable retention portion includes a retaining tab to facilitate securing and retaining the retainer within the cable retention portion, a mounting clip coupled to and extending from the secondary cable interface portion, the mounting clip configured to temporarily secure the secondary tension coupling device to a portion of the vehicle, and a plurality of spool pegs extending from the secondary cable interface portion, the plurality of spool pegs configured to take up excess length of the secondary cable. The plurality of spool pegs includes first, second, and third spool pegs, and the secondary cable is selectively wound around the secondary cable interface portion and secured between the first and second spool pegs, and between the third spool peg and the intermediate portion.

In accordance with another example aspect of the invention, an electric vehicle is provided. In one example implementation, the electric vehicle includes a charge port configured to selectively lock a charge plug to the charge port, a charge port door configured to provide access to the charge port, a charge port door lock configured to selectively lock the charge port door in a closed position, a primary manual release cable operably coupled to the charge port to manually unlock the charge plug from the charge port, and a secondary tension cable system coupled between the primary manual release cable and the charge port door lock. Actuation of the primary manual release cable simultaneously unlocks the charge plug from the charge port and actuates the secondary tension cable system to unlock the charge port door lock.

The secondary tension cable system includes a primary cable interface portion, a secondary cable interface portion configured to couple to a secondary cable operably coupled to a charge port door lock for manually unlocking the charge port door lock, and an intermediate portion disposed between the primary cable interface portion and the secondary cable interface portion. Actuation of the primary manual release cable causes actuation of the secondary cable via the secondary tension coupling device. The primary cable interface portion includes a retention clip extending from a main body portion, the retention clip and the main body portion define a receiving slot therebetween configured to receive the primary manual release cable, and the primary cable interface portion further includes a retention feature extending outwardly from the main body portion toward the retention clip. The retention feature is configured to retain the primary manual release cable within the receiving slot, and the retention feature includes a ramped surface and a stop surface. The retention clip includes an aperture configured to receive at least a portion of the retention feature therein.

The secondary cable interface portion includes a hollow shell configured to receive one end of the secondary cable. The hollow shell includes a cable receiving portion and a cable retention portion, and the cable receiving portion defines a cable slot configured to receive the secondary cable therethrough, and a retainer slot configured to receive a retainer coupled to the secondary cable. A width of the retainer slot is larger than a width of the retainer, and a width of the cable retention portion is smaller than the width of the retainer slot so as to facilitate securing the retainer to the cable retention portion. The cable retention portion includes a retaining tab to facilitate securing and retaining the retainer within the cable retention portion.

A mounting clip is coupled to and extends from the secondary cable interface portion, and the mounting clip is configured to temporarily secure the secondary tension coupling device to a portion of the vehicle. A plurality of spool pegs extend from the secondary cable interface portion, the plurality of spool pegs configured to take up excess length of the secondary cable. The plurality of spool pegs includes first, second, and third spool pegs, and the secondary cable is selectively wound around the secondary cable interface portion and secured between the first and second spool pegs, and between the third spool peg and the intermediate portion.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

The present application is generally directed to a coupling device for a secondary tension cable control that allows attachment to a primary tension cable control so as to allow both the primary and secondary functions to be executed by a single input.

Figure 1:
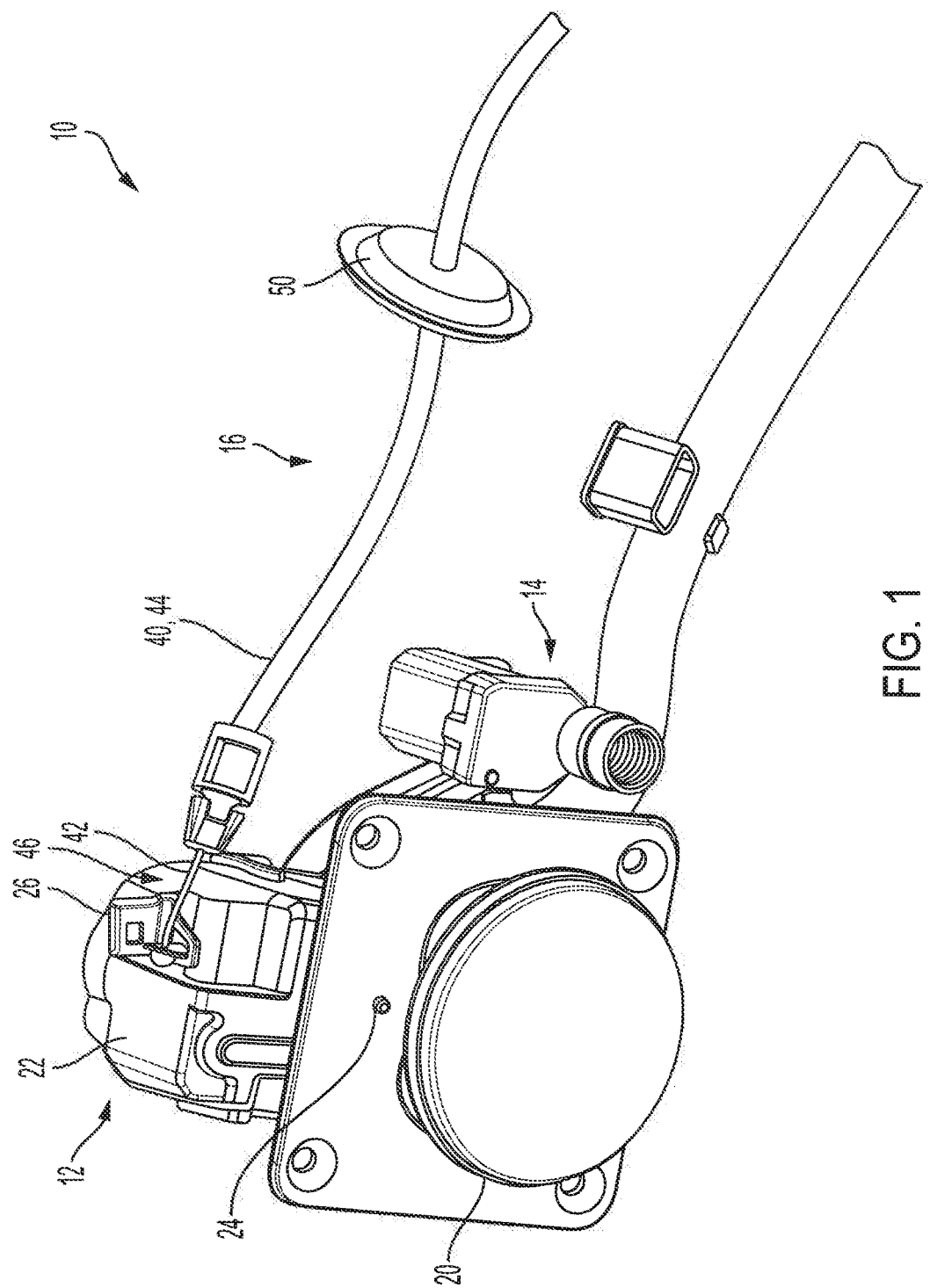
FIG. 1 is a perspective view of an example charge port system for a vehicle, according to the principles of the present disclosure.

Referring to FIG. 1, an example electric charge port system for a vehicle is generally shown and indicated at reference numeral 10. In the example embodiment, the charge port system 10 is generally intended for electric vehicles such as hybrid electric vehicles, battery electric vehicles, plug-in hybrid electric vehicles, and the like. However, it will be appreciated that the systems described herein may be utilized with various other vehicles or machines.

In the example embodiment, charge port system 10 generally includes a charge port assembly 12, a charge port door lock 14, and a manual release primary tension cable system 16. With additional reference to FIG. 2, a secondary tension cable system 18 is coupled between the primary cable system 16 and the charge port door lock 14, as described herein in more detail.

In the example embodiment, the charge port assembly 12 generally includes a charge port 20, a port lock module 22, a locking pin 24, and a manual release lever 26. The charge port 20 is configured to receive a charge plug (not shown) to electrically couple the vehicle batteries to a power source (e.g., a charging station). The port lock module 22 houses mechanical and electrical components (not shown) for actuating the locking pin 24.

The locking pin 24 is configured to selectively lock the charge plug to the charge port 20 during charging. In the example embodiment, the locking pin 24 is movable between a locked position and an unlocked position by an actuator (not shown) disposed within the port lock module 22. In the locked position, the locking pin 24 extends out of the charge port 20 (as shown in FIG. 1) to thereby lock the charge plug to the charge port 20. In the unlocked position, the actuator withdraws the locking pin 24 at least partially into the charge port 20 to enable a user to detach the charge plug from the charge port 20.

In the event of a power loss, the locking pin 24 can be manually moved to the unlocked position by manually rotating the release lever 26, as described herein in more detail. As illustrated, the manual release lever 26 is rotatably coupled to an outer surface of the port lock module 22, which includes mechanical connections (not shown) between the locking pin 24 and the manual release lever 26 for manually overriding the charge port lock function.

In the example embodiment, the charge port door lock 14 is disposed adjacent the charge port 20 and is configured to selectively lock a charge port door (not shown) that selectively provides access to the charge port 20. In one example, the charge port door may be rotatably coupled to the vehicle body similar to a fuel door for a filler port.

In the example embodiment, manual release primary tension cable system 16 generally includes a primary cable 40 (e.g., a Bowden cable) configured to impart a force from one end of the cable to another. The primary cable 40 includes a braided wire cable 42 disposed within a cable sheath 44. The primary cable 40 includes a first end having a reset biasing mechanism 46 (e.g., a spring) and a retainer 48, and a second end (not shown). In the example embodiment, the retainer 48 is semi-spherical. However, it will be appreciated that retainer 48 can have various other shapes. The manual release lever 26 retains the primary cable 40, and the primary cable second end is configured to be pulled by a user to engage the retainer 48, the reset biasing mechanism 46, and the release lever 26. This compresses the reset biasing mechanism 46 and subsequently actuates the manual release lever 26. In some examples, a cable guide 50 is configured to route the primary cable 40 and/or secure primary cable 40 to the vehicle body (e.g., 52 in FIG. 2).

Figure 2:
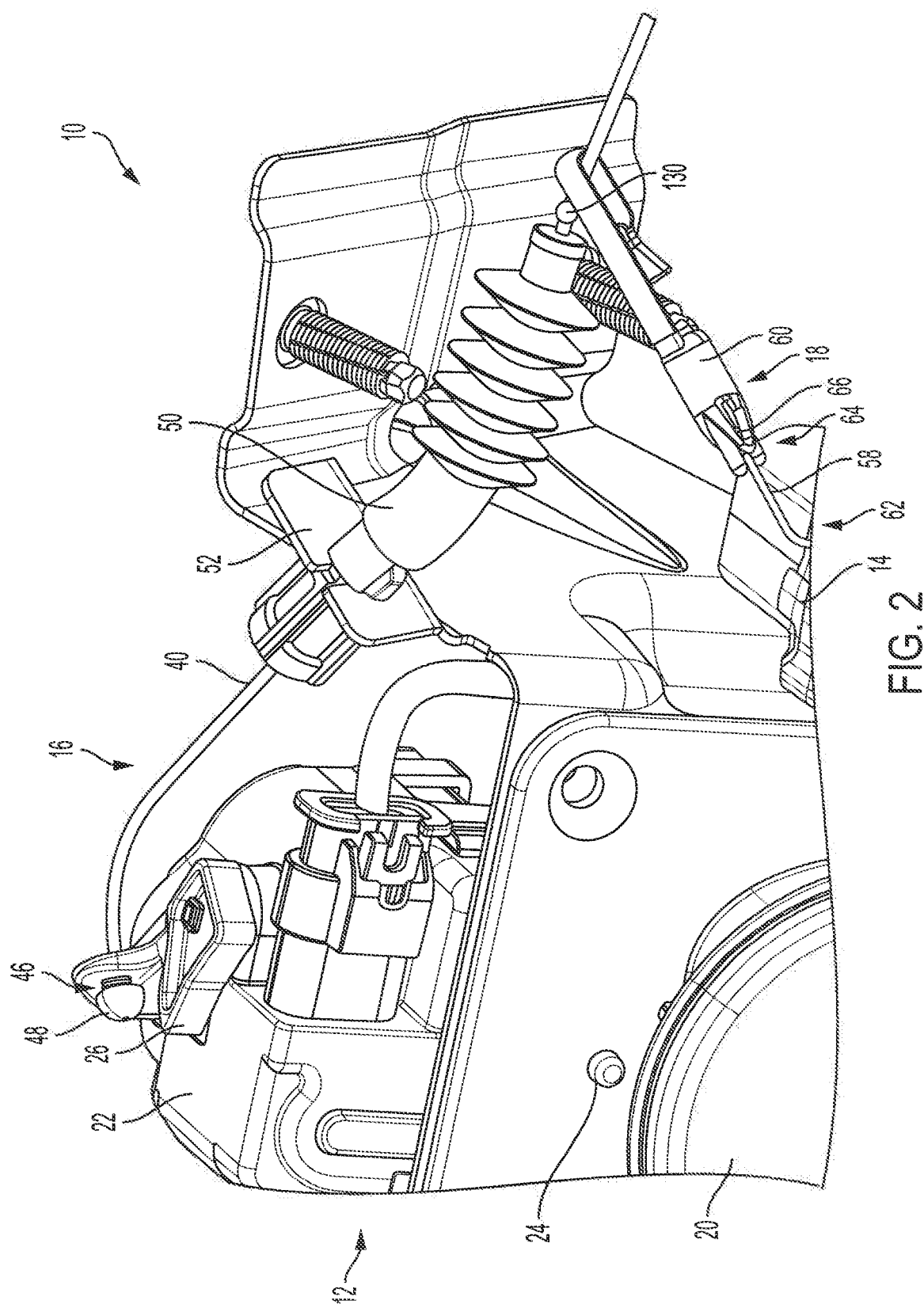
FIG. 2 is a perspective view of the charge port system of FIG. 1 with an example secondary tension system, according to the principles of the present disclosure.

With further reference to FIG. 2, in the example embodiment, the secondary tension cable system 18 is coupled between the primary cable system 16 and the charge port door lock 14 such that manual actuation of the primary cable system 16 actuates both the manual release lever 26 and the charge port door lock 14. The secondary tension cable system 18 generally includes a secondary cable 58 and a secondary tension coupling device 60.

In the example embodiment, the secondary cable 58 includes a first end 62 and an opposite second end 64. The first end 62 is mechanically coupled to the charge port door lock 14, and the second end 64 is coupled to a retainer 66. In the example embodiment, retainer 66 is semi-spherical (e.g., similar to retainer 48) and is configured to couple the cable second end 64 to the secondary tension coupling device 60, as described herein in more detail. When pulled (or pushed in the alternative), secondary cable 58 is configured to manually unlock the door lock 14. When the door lock 14 is reactivated, a portion of the secondary cable 58 is retracted and the manual override is reset.

Figure 3:
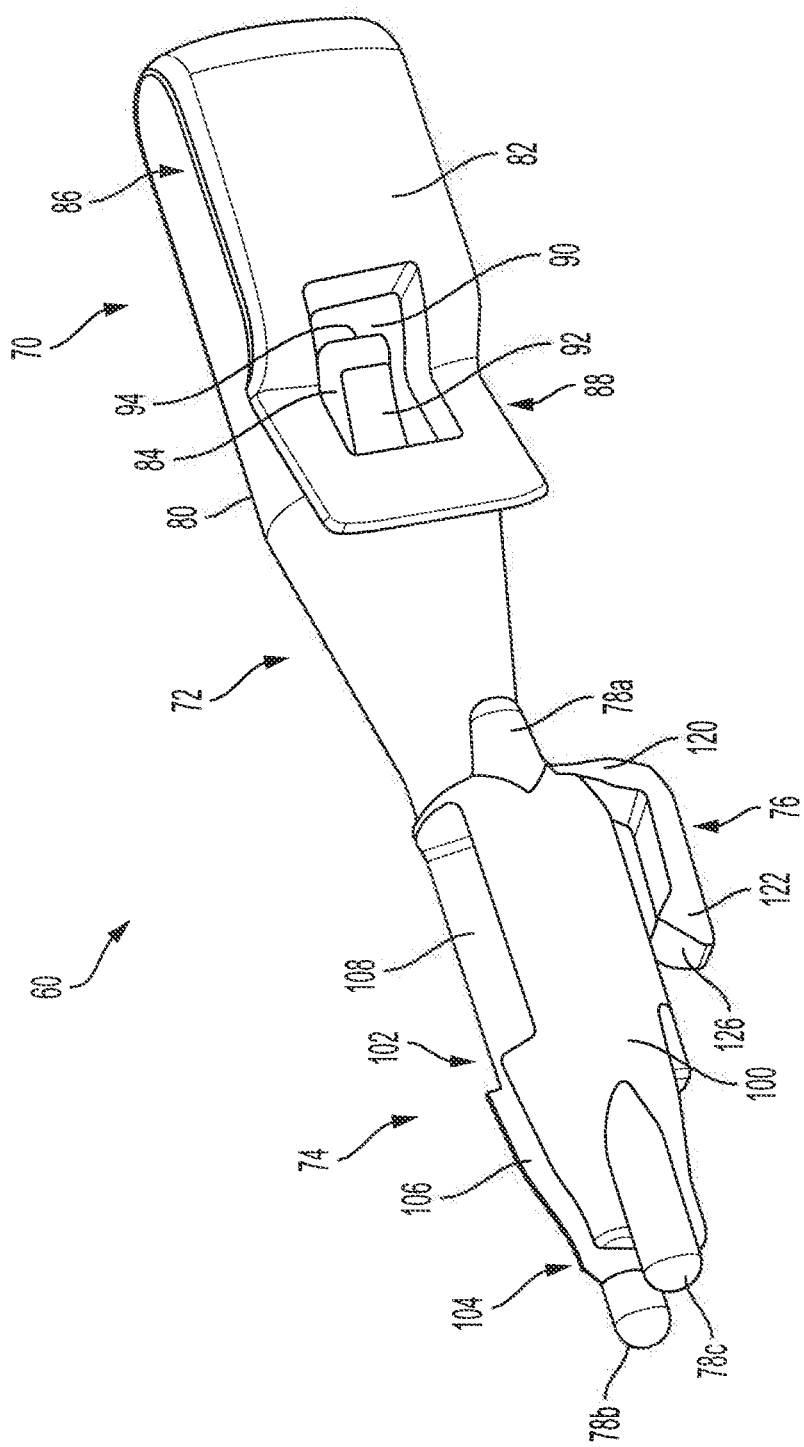
FIG. 3 is a perspective view of an example coupling device of the secondary tension system shown in FIG. 2, according to the principles of the present disclosure.
Figure 4:
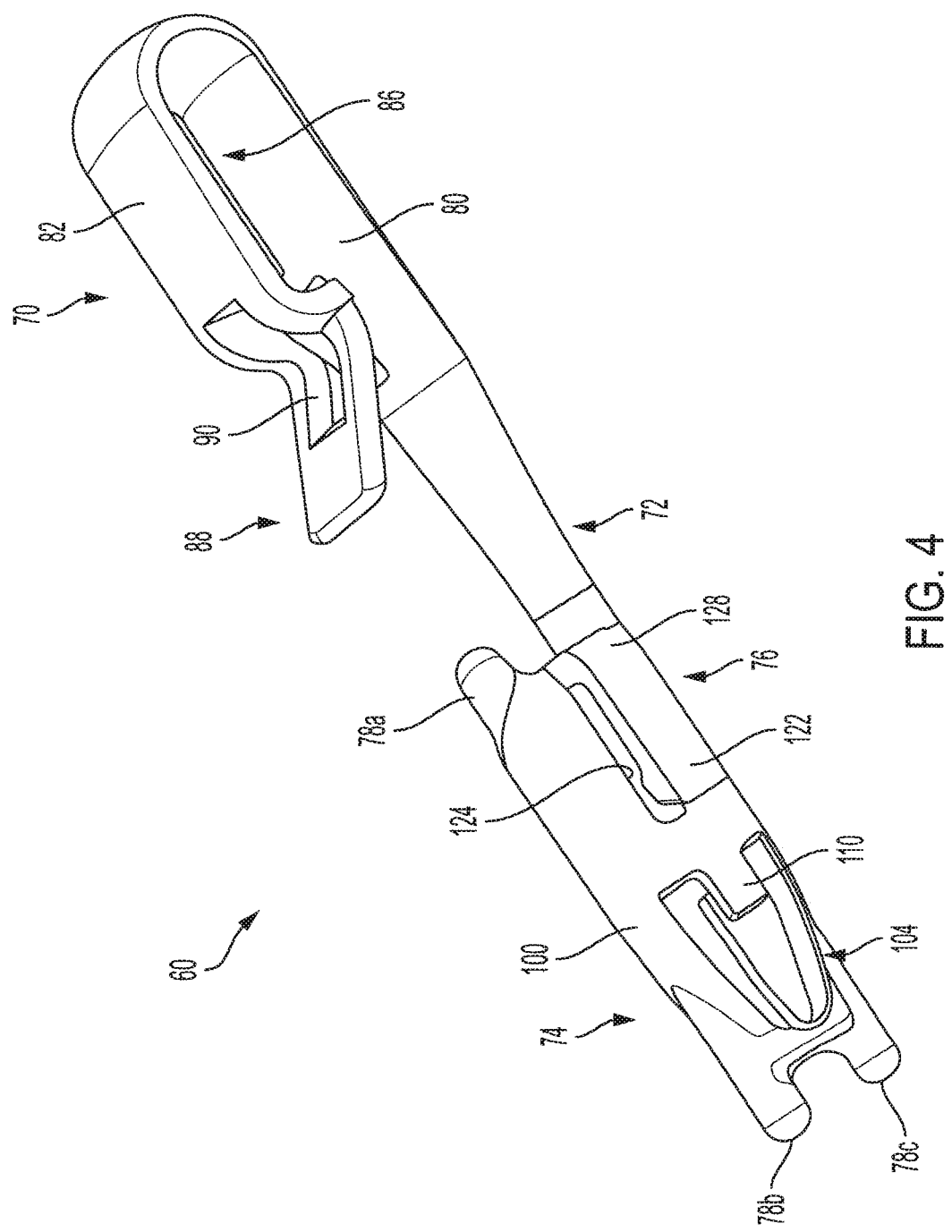
FIG. 4 is another perspective view of the coupling device shown in FIG. 3, according to the principles of the present disclosure.

With further reference to FIGS. 3 and 4, the secondary tension coupling device 60 will be described in more detail. In the example embodiment, the secondary tension coupling device 60 generally includes a primary cable clip or interface portion 70, an intermediate portion 72, a secondary cable interface portion 74, a mounting clip 76, and a plurality of spool pegs 78.

In the illustrated example, the intermediate portion 72 is coupled between the primary cable interface portion 70 and the secondary cable interface portion 74. The intermediate portion 72 is configured to facilitate gripping the coupling device 60 during assembly. The primary cable interface portion 70 generally includes a main body portion 80, a retention clip 82, and a retention feature 84 (see FIG. 3). The retention clip 82 extends from and folds back over the main body portion 80 to define a receiving slot 86 between retention clip 82 and main body portion 80 for receiving the primary cable 40. A distal end 88 of the retention clip 82 defines an aperture 90 configured to receive at least a portion of the retention feature 84 therein.

In the example embodiment, retention feature 84 is a protrusion extending outwardly from the main body portion 80 into the retention clip aperture 90. The retention feature 84 includes a ramped surface 92 and a stop surface 94. In this way, during assembly, the primary cable 40 is disposed between the main body portion 80 and the retention clip distal end 88, and subsequently forced toward the receiving slot 86. During this motion, the primary cable 40 slides upward along the ramped surface 92, which forces the retention clip 82 outward to allow the primary cable to pass into the receiving slot 86. Once the primary cable 40 clears the retention feature 84 and is disposed within the receiving slot 86, the retention clip 82 returns to the normal position with retention feature 84 disposed within retention clip aperture 90. The retention feature stop surface 94 facilitates preventing inadvertent removal of the primary cable 40 from the receiving slot 86 without manual lifting of the retention clip 82 via the distal end 88.

With continued reference to FIGS. 3 and 4, in the example embodiment, the secondary cable interface portion 74 extends from the intermediate portion 72 and generally includes a hollow body or shell 100 having a cable receiving portion 102 and a cable retention portion 104. The receiving portion 102 defines a cable slot 106 and a retainer slot 108. During coupling between the secondary cable 58 and the secondary tension coupling device 60, the secondary cable second end 64 is inserted through the cable slot 106 such that the retainer 66 is received within the retainer slot 108. In the example embodiment, the retainer slot 108 has a width larger than a width of the retainer 66 such that the retainer is easily received within the hollow shell 100.

Once the retainer 66 is disposed within the hollow shell 100, the secondary cable 58 and the secondary tension coupling device 60 are pulled away from each other, thereby causing the secondary cable 58 to feed out of a bottom end of the hollow shell 100 and the retainer 66 to move toward the cable retention portion 104. As illustrated, the cable retention portion 104 has a width smaller than the receiving portion 102, thus providing a wedge or an interference fit between the retainer 66 and the cable retention portion 104, to thereby maintain a coupling between the secondary cable 58 and the secondary tension coupling device 60. Moreover, in the example embodiment, the cable retention portion 104 includes a retaining tab 110 (FIG. 4) configured to enable the retainer 66 to snap into the cable retention portion 104 and provide a stop to facilitate preventing retainer 66 from backing out of the cable retention portion 104 and hollow shell 100.

In the example embodiment, the mounting clip 76 generally includes a proximal end 120 and a distal end 122. The proximal end 120 is coupled to and extends from the hollow shell 100. The mounting clip 76 is disposed at least partially within a cutout 124 formed in the hollow shell 100, and the mounting clip distal end 122 includes a protruding retention feature 126. In use, for example during shipping, the mounting clip 76 is utilized to clip the secondary tension coupling device 60 and attached secondary cable 58 to a portion of the vehicle such that they do not get caught on components or otherwise get in the way during vehicle assembly. When secondary tension coupling device 60 is ready for coupling to the primary cable 40, the mounting clip 76 is unclipped from the vehicle.

With continued reference to FIGS. 3 and 4, the plurality of spool pegs 78 are formed on the hollow shell 100. The spool pegs 78 are configured to take up excess any length of the secondary cable 58. In the illustrated example, one spool peg 78*a* extends outwardly from one end of the hollow shell 100 while a pair of spool pegs 78*b* and 78*c* extend outwardly from the opposite end of the hollow shell 100. Accordingly, excess secondary cable 58 can be wound about hollow shell 100 and secured between spool peg 78*a* and the intermediate portion 72, and between the spool pegs 78*b*, 78*c*. While FIGS. 3 and 4 illustrate three spool pegs 78, it will be appreciated that secondary tension coupling device 60 may have any number of spool pegs that enables device 60 to function as described herein.

In the final assembly shown in FIG. 2, the primary cable interface portion 70 is attached to the primary cable 40 as a one-way clip. A positive stop 130 (e.g., a ball) is formed or disposed on the primary cable 40 and is configured to engage or otherwise catch the primary cable interface portion 70 when the primary cable 40 is pulled. As such, pulling motion of the primary cable 40 is imparted to the secondary tension coupling device 60, which pulls the secondary cable 58 and unlocks the port door lock 14. Accordingly, a single actuation of the manual release primary cable 40 simultaneously unlocks the charge port locking pin 24 and the charge port door lock 14. Upon release of tension, the return biasing mechanism 46 retracts a length of the primary cable 40 within the system thereby relieving tension on the secondary cable 58 and allowing door lock 14 to reactivate with minimal resistance.

Described herein are systems and methods for controlling the manual release (override) of both a charge port lock and a charge port door lock with a single input. The system includes a secondary tension cable control that allows attachment to a primary tension cable control so as to allow both the primary and secondary functions to be manually executed by the single input. The secondary tension cable control includes a coupling device having a plurality of features such as a primary cable clip portion, a secondary cable clip portion, a mounting clip, and a plurality of spool pegs to secure excess cable.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An electric vehicle comprising:
a charge port configured to selectively lock a charge plug to the charge port;
a charge port door configured to provide access to the charge port;
a charge port door lock configured to selectively lock the charge port door in a closed position;
a primary manual release cable operably coupled to the charge port to manually unlock the charge plug from the charge port; and
a secondary tension cable system coupled between the primary manual release cable and the charge port door lock,
wherein actuation of the primary manual release cable simultaneously unlocks the charge plug from the charge port and actuates the secondary tension cable system to unlock the charge port door lock.

2. The vehicle of claim 1, wherein the secondary tension cable system comprises a secondary tension coupling device and a secondary cable operably coupled to the charge port door lock for manually unlocking the charge port door lock.

3. The vehicle of claim 2, wherein the secondary tension coupling device comprises:
a primary cable interface portion for coupling to the primary manual release cable;
a secondary cable interface portion configured to couple to the secondary cable; and
an intermediate portion disposed between the primary cable interface portion and the secondary cable interface portion,
wherein actuation of the primary manual release cable causes actuation of the secondary cable via the secondary tension coupling device.

4. The vehicle of claim 3, wherein the secondary cable interface portion includes a hollow shell configured to receive one end of the secondary cable.

5. The vehicle of claim 4, wherein the hollow shell includes a cable receiving portion and a cable retention portion.

6. The vehicle of claim 5, wherein the cable receiving portion defines a cable slot configured to receive the secondary cable therethrough, and a retainer slot configured to receive a retainer coupled to the secondary cable.

7. The vehicle of claim 6, wherein a width of the retainer slot is larger than a width of the retainer, and a width of the cable retention portion is smaller than the width of the retainer slot so as to facilitate securing the retainer to the cable retention portion.

8. The vehicle of claim 6, wherein the cable retention portion includes a retaining tab to facilitate securing and retaining the retainer within the cable retention portion.

9. The vehicle of claim 3, further comprising a mounting clip coupled to and extending from the secondary cable interface portion, the mounting clip configured to temporarily secure the secondary tension coupling device to a portion of the electric vehicle.

10. The vehicle of claim 3, further comprising a plurality of spool pegs extending from the secondary cable interface portion, the plurality of spool pegs configured to take up excess length of the secondary cable.

11. The vehicle of claim 10, wherein the plurality of spool pegs includes first, second, and third spool pegs.

12. The vehicle of claim 11, wherein the secondary cable is selectively wound around the secondary cable interface portion and secured between the first and second spool pegs, and between the third spool peg and the intermediate portion.

13. The vehicle of claim 3, wherein the primary cable interface portion includes a retention clip extending from a main body portion.

14. The vehicle of claim 13, wherein the retention dip and the main body portion define a receiving slot therebetween configured to receive the primary manual release cable.

15. The vehicle of claim 14, wherein the primary cable interface portion further includes a retention feature extending outwardly from the main body portion toward the retention clip, the retention feature configured to retain the primary manual release cable within the receiving slot.

16. The vehicle of claim 15, wherein the retention feature includes a ramped surface and a stop surface.

17. The vehicle of claim 15, wherein the retention clip includes an aperture configured to receive at least a portion of the retention feature therein.

18. The vehicle of claim 3, further comprising:
wherein the primary cable interface portion includes a retention clip extending from a main body portion, wherein the retention clip and the main body portion define a receiving slot therebetween configured to receive the primary manual release cable, wherein the primary cable interface portion further includes a retention feature extending outwardly from the main body portion toward the retention clip, the retention feature configured to retain the primary manual release cable within the receiving slot, wherein the retention feature includes a ramped surface and a stop surface, and wherein the retention clip includes an aperture configured to receive at least a portion of the retention feature therein;
wherein the secondary cable interface portion includes a hollow shell configured to receive one end of the secondary cable, wherein the hollow shell includes a cable receiving portion and a cable retention portion, wherein the cable receiving portion defines a cable slot configured to receive the secondary cable therethrough, and a retainer slot configured to receive a retainer coupled to the secondary cable, wherein a width of the retainer slot is larger than a width of the retainer, and a width of the cable retention portion is smaller than the width of the retainer slot so as to facilitate securing the retainer to the cable retention portion, and wherein the cable retention portion includes a retaining tab to facilitate securing and retaining the retainer within the cable retention portion;
a mounting clip coupled to and extending from the secondary cable interface portion, the mounting clip configured to temporarily secure the secondary tension coupling device to a portion of the electric vehicle; and
a plurality of spool pegs extending from the secondary cable interface portion, the plurality of spool pegs configured to take up excess length of the secondary cable, wherein the plurality of spool pegs includes first, second, and third spool pegs, and wherein the secondary cable is selectively wound around the secondary cable interface portion and secured between the first and second spool pegs, and between the third spool peg and the intermediate portion.

* * * * *